J. Davis,
Bee Hive.
No. 97,055. Patented Nov. 23. 1869.
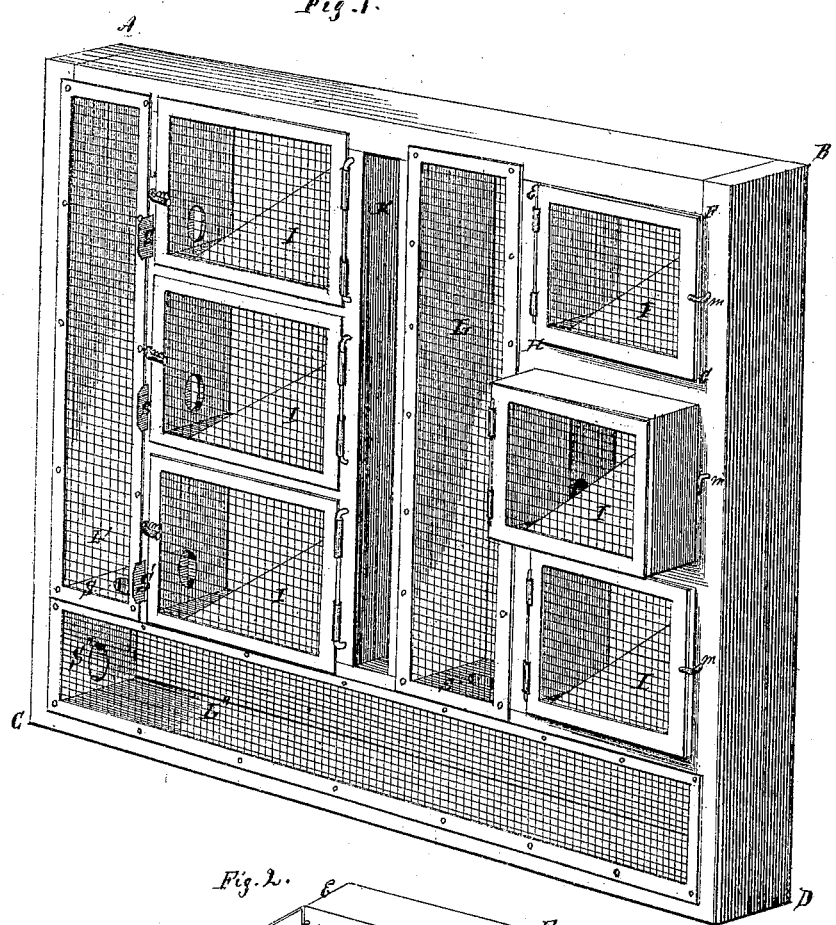
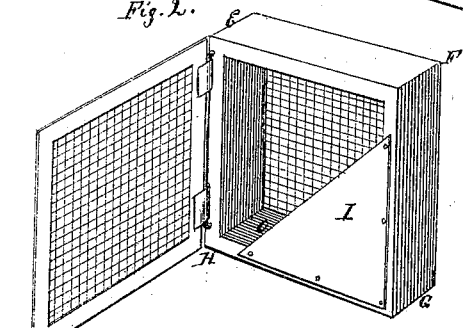
Witnesses:
Horace R Allen
Oscar J. R. Hanna
Inventor
Jewell Davis

United States Patent Office.

JEWELL DAVIS, OF INDIANAPOLIS, INDIANA.

Letters Patent No. 97,055, dated November 23, 1869.

IMPROVEMENT IN HIVE FOR RAISING QUEEN BEES.

The Schedule referred to in these Letters Patent and making part of the same.

To all whom it may concern:

Be it known that I, JEWELL DAVIS, of Indianapolis, county of Marion, and State of Indiana, have invented a new and useful Improvement in Queen-Bee Nurseries; and the following is a full, clear, and exact description thereof, reference being had to the accompanying drawings, and to the letters and figures of reference marked thereon.

The nature of the invention consists in making a cage of wire-work, for the culture of queen bees, of such a form and construction that it may be fastened in a frame of wood-work, with others of the same kind, or used singly, and that, during the rearing of the queen bee, the food provided for her will not be stolen by other bees in the same hive, said device to be made of wood-work and iron wire, or any other convenient and suitable materials.

To enable others skilled in the art to make and use my said invention, I proceed to describe it more fully, as follows:

A B C D of Figure 1 of the accompanying drawings is a frame of wood, of the form there represented. In this are six or any other convenient number of compartments, like the one represented by E F G H.

In each of these compartments is put a cage or box, of wire net, like that represented in Figure 2.

This box or cage is provided with a convenient door, by which it may be opened or closed at pleasure.

I I are shields, forming, by the combination of their sides and the bottom of the cage, a secure box or trough, as represented in said fig. 2, to protect the food of the queen bee from the inroads of other bees that may be in the same colony.

At S' is a slide, through which the queen bee may be released, if desirable, and then she comes into L or L', which is a covered way, through which she may pass, by means of the aperture S in the floor of said covered way, into the covered way L". She is then ready to begin her function of procreation.

To use my said invention, a cell containing a queen bee embryo sealed is cut out of the comb, and suspended in the cage. A portion of honey in the comb, or a sponge saturated with honey, is laid in the cage, between I and I, in such a way that it cannot be reached by outside bees. The cage or frame of cages is placed in the interior of a strong colony of thriving bees, and remains there until such time as the queen bee has obtained sufficient maturity to assume the function of procreation, when she is released, as aforesaid.

I do not claim the slide S', or the wire-net cage, as heretofore used; but

I do claim, and desire to secure by Letters Patent—

1. The shields I and I, when constructed and used in manner and form substantially as set forth.

2. The combination of the wire cages with the wooden frame-work A B C D, constructed with the compartments E F H G, and the covered ways L L, L' L", and L" L", whereby, if it is not desirable to use one cage singly, it can be advantageously used in connection with several others, substantially as set forth.

In testimony that I claim the foregoing specification, I have hereunto set my hand and seal, this 23d day of September, 1869.

JEWELL DAVIS. [L. S.]

Witnesses:
 CHARLES WERBE,
 H. G. PERINE.